Nov. 15, 1966   E. M. JEPPSSON ET AL   3,285,375
SLACK ADJUSTER
Filed Sept. 17, 1964
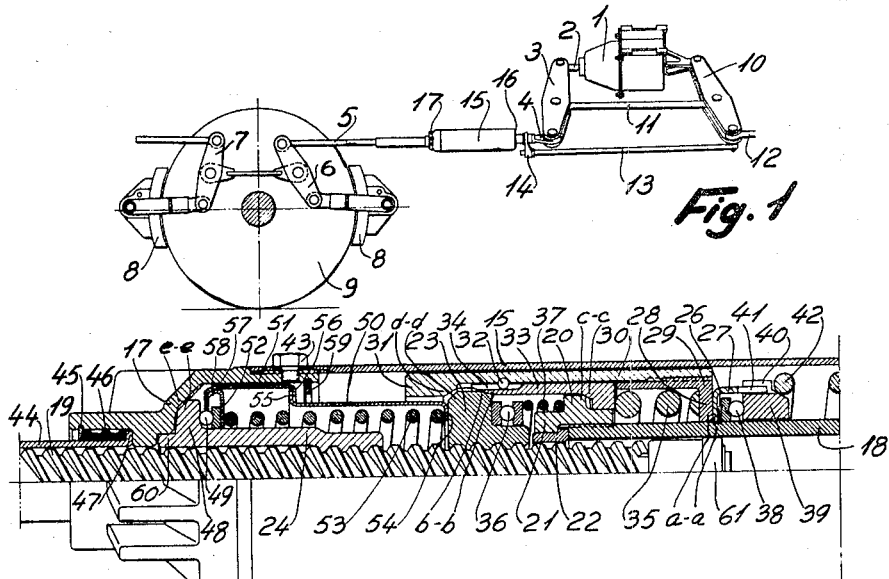
Fig. 1
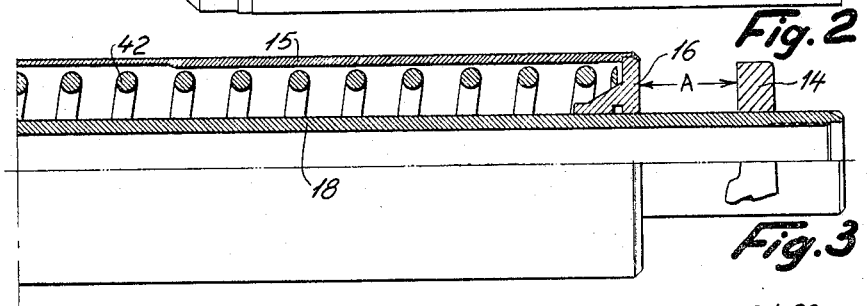
Fig. 2
Fig. 3
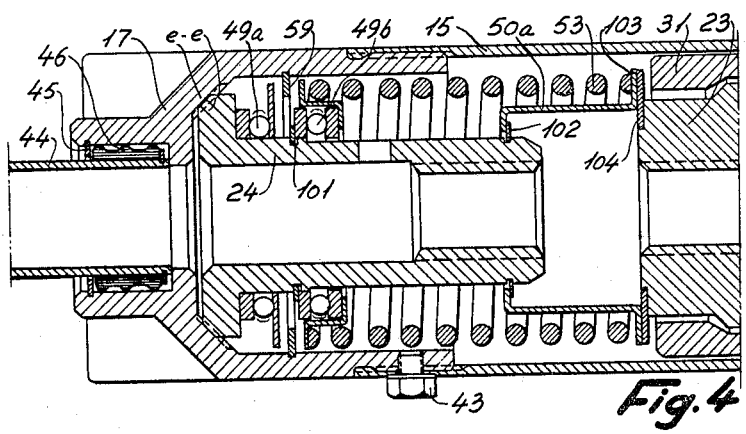
Fig. 4
INVENTORS
Erik M. Jeppsson
Nils B. L. Sander
BY Watson, Cole, Grindle & Watson
ATTORNEYS

United States Patent Office 3,285,375
Patented Nov. 15, 1966

3,285,375
SLACK ADJUSTER
Erik Mauritz Jeppsson and Nils Börje Lennart Sander, Malmo, Sweden, assignors to Svenska Aktiebolaget Bromsregulator, Malmo, Sweden, a Swedish company
Filed Sept. 17, 1964, Ser. No. 397,141
9 Claims. (Cl. 188—196)

This invention relates to an automatic slack adjuster for brakes, especially for use in the brake rigging of railway cars.

More particularly, the invention relates to a double-acting slack adjuster, i.e. a device by means of which a too great slack in the rigging, e.g. resulting from wear, may be reduced and a too small slack, e.g. resulting from the replacement of brake shoes, may be increased.

Still more particularly, the invention relates to a slack adjuster of the type widely spread and known as the SAB-DRV slack adjuster, as e.g. illustrated in a pamphlet of Svenska Aktiebolaget Bromsregulator, Malmo, Sweden, entitled "The SAB Brake Regulator Type DRV" published under No. 726 B, December 1962—a purely mechanical type comprising two interconnected brake rod parts which may be axially displaced relative to one another by means of screw and nut connections.

While the earlier design of the said DRV slack adjuster has proved to be satisfactory under ordinary circumstances, the use of automatic slack adjusters is now being extended to various new fields, where the operating conditions are much more severe than hitherto usual, so that the danger of heavy vibrations and shocks causing unintended relative movements of the brake rod parts is correspondingly greater. As examples of such new field of use, the following may be mentioned:

(1) Railways with bad tracks, often in countries where the manual labor costs have risen quite recently, (2) Railways recently provided with rolling stock adapted to higher speeds, (3) Modern diesel powered motor coach trains having less tare weight relative to the maximum weight than was previously the case. Such trains were previously fitted with single-acting adjusters.

It is an object of the invention to devise a slack adjuster of the type referred to which offers a particularly high security against unintended relative movements of the brake rod parts under severe operating conditions involving heavy vibrations and shocks.

Another object of the invention is to devise a slack adjuster of the type referred to in which the extension of the slack adjuster inevitably occurring during the application of the brakes is reduced to a minimum.

A further object of the invention is to devise a slack adjuster of the type referred to in which manual adjustment is facilitated.

A still further object of the invention is to devise a slack adjuster of the type referred to in which the various springs forming part of the adjuster are more independent of one another than in the earlier SAB-DRV slack adjuster so that each one may be selected solely from considerations of the specific function it has to perform.

According to one aspect of the invention, an automatic slack adjuster comprises two telescopically displaceable rod parts, one of said rod parts being provided with a screw threaded portion carrying two nuts, locking means for locking one of said nuts, when the braking force transmitted through the slack adjuster exceeds a pre-determined value, sensing means for recording deviatations from normal slack in the brake rigging, a barrel surrounding said two nuts, said locking means and said sensing means as well as the adjacent ends of said two rod parts, one of said nuts being clutchably engaged with said barrel in the released state of the slack adjuster, but being releasable from said engagement when transmitting brake force, means for axially moving said one nut on the threads of said one rod part in response to axial movement of said barrel relative to said one rod part in case of insufficient slack in the rigging or in case of stretching in the rigging during brake application, tooth means on said one nut and said barrel to establish said clutchable engagement therebetween, a telescopically compressible sleeve mounted between said two nuts, and a biased spring in said telescopically compressible sleeve, the latter having an axial play relative to a shoulder of said barrel slightly greater than the overlapping of said tooth means of said barrel and said one nut.

According to another aspect of the invention, an automatic slack adjuster connecting two brake rod parts and of the type in which adjustment by rotating two nuts inside a barrel of said slack adjuster may be carried out manually by rotating said barrel, comprises means for transmitting torque from said barrel to one of said nuts comprising a barrel spring, a lift ring, a traction sleeve transmitting the braking force to said one nut when the braking force exceeds the force of said barrel spring, a spider sleeve clamped between a shoulder on one of said rod parts and said traction sleeve under the influence of a strong spring, said spider sleeve and said lift ring being clutchably connected in such a manner as to permit relative axial movement thereof.

Further feature and objects of the invention will be apparent to those skilled in the art from the following detailed description of one embodiment of the invention with reference to the accompanying drawings.

Before, however, proceeding to this detailed description, a definition will be given of certain concepts to be used in the description and in the appended claims.

From one point of view, the slack adjuster according to the invention may be characterized principally by the manner in which the various elements of which it is composed are arranged to engage with one another, either directly or indirectly, in axial direction of the slack adjuster. For the purposes of such characterization, in the following description the forward direction is defined as the direction of movement, during application of the brakes, of the brake rod in which the slack adjuster is mounted. The expressions "front" and "rear" refer to the relative location of parts as viewed in the same direction. An element is said to be forwardly engageable with another element when the force exerted by the former element on the latter element is in the forward direction. The engagement may be either direct or indirect, i.e. through intervening elements. Similarly, an element is said to be rearwardly engageable with another element when the force exerted by the former element on the latter element is in the rearward direction. An element is said to be rotationally engageable with another element, when the engagement is of a character permitting substantially unrestrained mutual rotation of the two elements, e.g. through the intermediary of a ball bearing. Similarly, an element is said to be clutchably engageable with another element when the engagement is of a character offering substantial resistance to mutual rotation of the two elements. Examples of clutchable engagement are frictional engagement and toothed engagement. The line of distinction between rotational and clutchable engagement is whether the engagement is of a character to permit or prevent rotation of the elements referred to below under the influence of axial forces.

Referring now to the accompanying drawings:

FIG. 1 is a diagrammatic illustration of one example of a brake rigging in which a slack adjuster according to the invention may be used, FIG. 2 shows, on a larger scale, the rear portion of one form of a slack adjuster according to the invention, in side view in the lower half of the figure, and in axial section in the upper half of the figure, FIG. 3 is a view similar to FIG. 2 illustrating the remaining front portion of the adjuster, and FIG. 4 a slightly modified form of some of the parts of the slack adjuster according to FIGS. 2 and 3 in axial section on a larger scale.

Referring first to FIG. 1, 1 is a brake cylinder provided with a piston rod 2 which is pivotally connected to one end of a live brake lever 3, the other end of which is connected to a cross head 4 forming part of a slack adjuster. The left hand or rear end of the slack adjuster is part of a rod 5, the extreme left end of which is connected to a lever system comprising a live brake lever 6 and a dead brake lever 7 for applying blocks or shoes 8 against a wheel 9. A dead brake lever 10 is pivotally connected to a bracket on the brake cylinder 1 and is connected to the live brake lever by a rod 11. The end of the dead brake lever 10 remote from the cylinder 1 is pivotally connected to a rod 12 which is adapted to be connected to a lever system for applying the brakes of another wheel. However, in order to simplify the following explanation, it will be assumed that the rod 12 is always kept stationary seeing that it is well known in the art that this makes no difference as regards the function of the brake rigging or the slack adjuster. A rod 13 carrying a reference stop 14 is also pivotally connected to the said remote end of the dead brake lever 10. Thus, for the purpose of the following explanation, the reference stop 14 may be assumed to be stationary.

The brake rigging just described and shown in FIG. 1 is of conventional type. The slack adjuster according to the invention may, of course, be used in any other conventional type of brake rigging provided that the required space is available.

Referring now particularly to FIGS. 2 and 3, the slack adjuster there illustrated comprises an elongated housing 15 consisting of a cylindrical shell or barrel closed at its front end by means of a front cover or plug 16, and at its rear end by means of a rear cover or plug 17. A front rod part 18 extends into the housing 15 from the front end thereof, and a rear rod part 19 extends into the housing 15 from the rear end thereof. The front rod part 18 is rigidly connected to the crosshead 4, FIG. 1, and is constructed in the form of a tube carrying at its rear end a collar member 20. The said collar member 20 is threaded on the tube 18 and is provided with an inwardly extending flange 21, a guiding sleeve 22 being clamped between the said flange 21 and the rear end of the tube 18.

The rear rod part 19 constitutes the front end of the rod 5 illustrated in FIG. 1 and is constructed in the form of a spindle having a steep screw thread, i.e. a screw thread the pitch of which is such that a nut engaged with the thread may be caused to rotate when exposed to an axial force (non self-locking thread).

The front end of the rear rod part 19 extends into the front rod part 18 and is guided therein by the sleeve 22. It carries two nuts, viz. a front nut 23 referred to in the following as the locking nut, and a rear nut 24 referred to in the following as the feeding nut.

The tubular front rod part 18 is provided with a split ring 26 mounted in a corresponding groove in the tube. The rear end surface of the split ring 26 is frictionally (thus clutchably) engageable with a front surface of a spider sleeve 27 forming a clutch a—a. The rear surface of the sleeve 27 is frictionally engageable with a front surface of an inwardly extending flange 28 of a coupling sleeve 29. This coupling sleeve 29 is threaded into a traction sleeve 30 so as to be rigidly connected therewith. At its rear end the traction sleeve is provided with an inwardly extending flange 31. The traction sleeve is also provided with a locking ball 32 mounted in a corresponding hollow depression in the interior cylindrical surface of the traction sleeve 30. A sliding sleeve 33 is provided in the traction sleeve 30 between the flange 31 and the coupling sleeve 29. The sliding sleeve 33 is provided with an axially extending groove 34 on its external cylindrical surface, the said ball 32 extending into said groove 34 so as to clutchably connect the sliding sleeve 33 and the traction sleeve 30 while permitting relative axial displacement of the sleeves.

The rear end of the sliding sleeve 33 is provided with a rear face which is frictionally engageable with a front face of the locking nut 23, the two faces forming a coupling b—b. The front end of the sliding sleeve 33 is provided with a rear face which is frictionally engageable with a front face of the collar member 20, the two faces forming a coupling c—c. The flange 31 of the traction sleeve 30 is provided with a front face adapted to frictionally engage a rear face of the locking nut 23, the two faces forming a coupling d—d.

A spring 35 which is biased at a force exceeding the resistance in the brake rigging during application of the brakes, i.e. before the brake blocks engage the wheel, is clamped between the sliding sleeve 33 and the flange 28 of the coupling sleeve 29.

A ball bearing 36 of the axial type is mounted with its rear race engaging a front surface of the locking nut 23 and a compression spring 37 is clamped between the front race of the said ball bearing 36 and a rear surface of the collar member 20.

The rear race of a ball bearing 38 of the axial type is mounted surrounding the tube 18 contacting a front surface of the split ring 26. The front race of the ball bearing is designed as a lift ring or spring supporting ring provided with an axially extending groove 40 on its peripheral surface. The said groove 40 is adapted to receive a finger 41 of the spider sleeve 27 so as to allow relative axial movements while preventing relative angular movements. A compression spring 42 is clamped between a front face of the lift ring 39 and a rear face of the front cover 16.

The rear cover 17 is threadedly connected to the housing 15 and secured by a screw 43. A tube 44 for protecting the threads of the rod part 19 outside the housing 15 is secured by a split locking ring 45 mounted in the rear cover 17, a gasket 46 being clamped between a flange 47 of the protecting tube 44 and said locking ring 45.

The feeding nut 24 is provided with a radially extending flange 48 having a toothed rearward face near its periphery for clutchably engaging a corresponding toothed front face of the inner wall of the rear cover 17, the two toothed faces forming a clutch e—e. The flange 48 is adapted to serve as the rear race of a ball bearing 49 of the axial type. Between the front race of the said ball bearing 49 and the rear surface of the locking nut 23 a spring sleeve unit is provided. The said unit consists of a cylindrical forward part 50, an intermediate sleeve part 51, a rear part 52 and a biased compression spring 53. The forward part 50 is provided with an inwardly bent flange 54 at its front end and an outwardly bent flange 55 at its rear end. The intermediate sleeve part 51 is provided with an inwardly bent flange 56 at its front end and an inclined inwardly bent flange 57 at its rear end. The rear part 52 of the unit is of disc shape provided with a flange 58 which tapers rearwardly and inwardly.

The spring 53 is clamped between the flange 54 of the forward part 50 and the rear part 52. The flanges 55 and 56 as well as the flanges 57 and 58 are adapted to engage each other frictionally.

A locking ring 59 is mounted inside the rear cover 17 at an axial distance from the flange 56 which is slightly greater than the axial overlapping of the teeth of the coupling e—e.

The rear end 60 of the feeding nut 24 is of such diameter as to protrude into a corresponding bore of the rear cover 17 with a small play. The front end of the rod part 19 is provided with a cylindrical stop member 61 leaving a small play relative to the bore of the tube 18. As will be clearly seen from FIG. 3, the stop 14 is provided with a hole through which the tube 18 is passed.

In the position shown in FIGURES 2 and 3, no axial forces are transmitted between the rod parts 18 and 19. The force of the strong spring 35 is transmitted from its forward end via the flange 28, the spider sleeve 27, coupling a—a, the locking ring 26, the tube 18, the collar member 20, coupling c—c, and the sliding sleeve 33 to the rear end of the strong spring 35.

The force of the spring 42, which is less than that of the spring 35, is transmitted from its forward end via the front cover 16, the housing 15, the rear cover 17, coupling e—e, feeding nut 24, rod 19, locking nut 23, coupling b—b, sliding sleeve 33, strong spring 35, flange 28, spider sleeve 27, coupling a—a, locking ring 26, ball bearing 38, and lift ring 39 to the rear end of the spring 42.

The force of the spring 53, which is weaker than the spring 42, is transmitted from its forward end via the three sleeve parts 50, 51 and 52 to its rear end.

The spring 37 is much weaker than the spring 53 and its force is of no significance compared with the forces exerted by the other springs.

The operation of the slack adjuster will now be described briefly with reference to FIG. 1.

During the braking stroke, the braking force is transmitted through the slack adjuster which thereby moves to the right in FIG. 1, or in other words travels in the direction defined above as the forward direction. If during this travel the housing 15 of the slack adjuster does not strike the reference stop 14 before a certain braking force has been developed, this is an indication that the slack of the brake rigging is too small, and pay-out is therefore required. However, as will be explained below, it is a characteristic feature of an adjuster of the type here considered that no pay-out will be performed unless two consecutive braking operations indicate that the slack is too small. If on the other hand the housing 15 does strike the reference stop 14 and is detained thereby, and the front rod 18 thereafter continues to travel beyond a certain predetermined distance before the full braking pressure is developed, this is an indication that the slack of the brake rigging is too great and take-up is required.

FIGURES 2 and 3 illustrate the positions occupied by the parts of the slack adjuster in the neutral position thereof, i.e. the position of the slack adjuster when the brakes are released and no axial forces are transmitted therethrough. FIG. 3 illustrates that the cover 16 is located at a distance A from the reference stop 14 when the brakes are released.

*Braking with normal slack in rigging*

During the initial stage of the braking operation the tension force may be transmitted from the tubular rod 18 to the rod 19 via the locking ring 26, ball bearing 38, lift ring 39, spring 42, front cover 16, housing 15, rear cover 17, coupling e—e, and feeder nut 24.

As soon as the force transmitted reaches the value of the force of spring 42, the said spring 42 will be compressed and the two rod parts 18 and 19 will be drawn away from each other, however only through the very small axial distance which is necessary in order to establish engagement of coupling d—d. From now the braking force will be transmitted between the two rods 18 and 19 via the following elements, collar member 20, coupling c—c, sliding sleeve 33, strong spring 35, coupling sleeve 29, traction sleeve 30, coupling d—d, and locking nut 23. During the proceeding braking operation the braking force transmitted will still increase and reach the force of the strong spring 35 when the front cover 16 contacts the reference stop 14, as this is our definition of the term normal slack.

At this moment the brake blocks will engage the wheel rim and all play in the transmission has been exhausted. The braking force will rise more suddenly upon a further travel of the brake piston and thus the spring 35, being an element in the transmission of the force, will be compressed until the sliding sleeve 33 abuts the coupling sleeve 29. The braking force is now transmitted from the collar member 20 via coupling c—c, the sliding sleeve 33, the coupling sleeve 29, the traction sleeve 30 and coupling d—d, to the locking nut 23. Simultaneously the clutch a—a has been opened. Now there are no resilient elements in the transmission path. During the following part of the braking operation the braking force will still increase and cause a stretching of the various elements in the path of transmission of the force from the brake piston to the brake blocks. Such stretching should have no influence upon the relative positions of the two brake rods 18 and 19.

During the forward travel of the brake rods 18 and 19 the housing 15 will be kept stationary after the engagement of the front cover 16 against the stop 14. Thus the spring 42 will be compressed and the clutch e—e will be released. After a relative displacement of the housing 15 corresponding to the axial distance between the flange 56 and the locking ring 59, the sleeve 51 will be kept stationary relative to the housing 15, and during a further forward travel of the threaded rod 19 the feeding nut will therefore be prevented from following the said axial movement and will start spinning on the threads which are drawn through it. The distance between the flange 54 and the locking nut 23 will increase and correspond to the stretching of the brake rigging.

During the release of the brake the force in the rigging will decrease gradually and the two rods 18 and 19 will move rearwardly, while the housing 15 is kept stationary. After a short displacement of the feeding nut 24, the clutch e—e will be axially engaged and during a further rearward travel of the two rods 18 and 19 the housing 15 will take part in the said movement. Consequently, the front cover 16 will be released from engagement with the stop 14, and as the clutch a—a is still disengaged—owing to the transmission of a braking force greater than the force of the spring 35—a unit consisting of the feeder nut 24, the housing 15, the spring 42, the lift ring 39 and the spider sleeve 27 will start rotating on the ball bearing 38 and on the threads of the rod 19, the spring 42 gradually expanding at the same time. This rotation will continue as long as the clutch a—a is open. When the force transmitted corresponds to the force of the spring 35 the clutch a—a will be engaged, and simultaneously the flange 54 will engage the locking nut 23. During the further rearward travel of the rods 18 and 19 the distance between the front cover 16 and the stop 14 will increase and the braking force will decrease. As soon as the force reaches the value of the spring 42, the two rods 18 and 19 will be relatively displaced in the axial direction and the clutch d—d will be disengaged while the clutch b—b will be engaged. During the remaining part of the releasing operation all parts of the slack adjuster will move rearwardly as one unit.

Briefly, during a braking cycle with normal slack in the rigging a stretching of the rigging will cause a rotation of the feeding nut in one direction and a subsequent corresponding rotation in the other direction of the feeding nut and the housing.

*Braking with excessive slack in rigging*

Normally the slack in the rigging will increase owing to wear of the brake blocks and a braking cycle with such rigging will now be described with reference to FIGS. 2 and 3.

During application of the brakes the braking force transmitted will increase and when it has reached the force of the spring 42 the rods 18 and 19 will be relatively displaced in the axial direction through the very small distance corresponding to disengagement of clutch b—b and engagement of clutch d—d. When the front cover 16 engages the stop 14, the force transmitted has not yet reached the value of the strong spring 35 and consequently the clutch a—a will remain engaged. During the further forward travel of the rods 18 and 19 the housing 15 will remain stationary and the clutch e—e will open. Shortly afterwards the locking ring 59 will engage the flange 56, and the feeding nut 24 will start rotating on the ball bearing 49, the threads of the rod 19 being drawn through it. The axial distance between the flange 54 and the locking nut 23 will increase and reach a value corresponding to the excessive slack in the moment the transmitted braking force corresponds to the force of the strong spring 35. During the remaining part of the braking operation and during the initial part of the following release of the brake the same idle movement of the feeding nut will be performed during the stretching of the rigging as described above in case of normal slack in the rigging. Thus the spinning of the feeding nut 24 will continue in the same direction after the opening of the clutch a—a, and the spinning of the feeding nut 24 in the opposite direction together with the housing 15 will be performed during the release of the brake until the clutch a—a is engaged. At this moment, however, there is an axial distance between the flange 54 and the locking nut 23 corresponding to the excessive slack in the rigging. During a further displacement of the rods 18, 19 towards the left, the rotation of the housing 15 and the feeding nut 24 is prevented by the engagement of the clutch a—a and thus the axial distance between the front cover 16 and the stop 14 will increase. As soon as the force transmitted has decreased to the magnitude of the spring 42, the clutch d—d will be released. Now the locking nut 23 is free to rotate on the rod 19 and will in fact start such rotation as it is prevented from moving forwards by the ball bearing 36 and the weak spring 37 while a compression force arising from the spring 42 is to be transmitted between the rod 19 and the traction sleeve 30. Therefore, the spinning of the nut 23 while the rod 19 is drawn through it forwardly will continue until the flange 54 contacts the nut 23.

When this happens, the rod 19 has been displaced forwardly relative to the rod 18 through an axial distance corresponding to the excessive slack. During the remaining part of the brake release operation the clutch b—b will be engaged and all elements will move rearwards without relative movements until the axial distance between the front cover 16 and the stop 14 is again "A."

*Braking with insufficient slack in rigging*

Owing to e.g. renewal of worn-out brake blocks or variations in the load of a car body resiliently supported on the wheel axles it may happen that slack becomes insufficient. As stated above, a slack adjuster of the type in question is able to increase the length of the rigging in a two-cycle operation. The reason for not completing the paying out in one operation is the fact that an excessive resistance in the rigging owing to the occasional occurrence of dirt, rust or ice might otherwise be registered by the automatic slack adjuster as a real occurrence of insufficient slack.

(a) *First braking cycle.*—During the application of the brake, the rods 18 and 19 are moved forwardly, and when the braking force reaches the value of the spring 42, the coupling b—b will be disengaged and the coupling d—d will be engaged. When the braking force has reached the value of the strong spring 35, there is still a distance "s" left between the front cover 16 and the stop 14. The said distance corresponds to the lack of slack and to the axial distance through which it is desired to draw out the rod 19 from the tubular rod 18. As the coupling a—a is open and as there is a distance "s" between the cover 16 and the stop 14, the spring 42 may expand while causing the unuit comprising the housing 15, the feeding nut 24 and the spring 42 to rotate on the ball bearing 38 and the threads of the rod 19 until the front cover 16 engages the stop 14. During the following braking operation the force transmitted will increase and a stretching of the rigging will occur. This will cause the performance of the same idle motion of the feeding nut 24 as described above in the case of normal slack in the rigging. Thus we may exclude this stage from the explanation and regard the situation when the cover 16 engages the stop 14 as a stage during the release of the brake. It should be remembered that owing to the expansion of the spring 42 and the axial forward movement of the housing 15, the spring 53 has been compressed and an axial distance "s" is now present between the flanges 55 and 56. During the release of the brake, the cover 16 leaves the stop 14 at the moment the transmitted force corresponds to the force of the strong spring 35. Thus the coupling a—a will engage and durnig the remaining release operation the adjuster will move as a unit without relative movements of its elements apart from the release of the coupling d—d and the engagement of the coupling b—b as soon as the transmitted force has decreased to the value corresponding to the force of the spring 42. When the brakes are fully released, the distance between the cover 16 and the stop 14 is "A–s" but the relative positions of the rods 18 and 19 are not influenced. What has happened during the cycle is solely that the housing has been displaced forwardly through the distance "s," the spring 42 has expanded, and the spring 53 has been compressed.

(b) *Second braking cycle.*—During application of the brakes the force transmitted will increase, and when it has reached a value corresponding to the force of the spring 42, the clutch b—b will open. However, owing to the force of the spring 53 the nut 23 will start spinning while moving forwardly on the rod 19 until the flanges 55 and 56 engage each other. This will cause a forward movement of the rod 18 through the distance "s" while the rear rod 19 will remain stationary. Thus the front cover 16 will engage the stop 14 as soon as the force transmitted corresponds to the force of the spring 42. Immediately afterwards the coupling d—d will be engaged and the rod 18 will have to travel forwardly through the distance "s" while compressing the spring 42 before the braking force transmitted reaches the value of the strong spring 35. The remaining part of the braking cycle is performed in the same way as in case of normal slack in the rigging. The adjuster has increased its length by the distance "s."

*Manual adjustment*

A manual adjustment of the length of the rigging may be carried out simply by revolving the housing 15. The torque will be transmitted direct from the housing to the nut 24 via the coupling c—c while the torque is transmitted to the nut 23 via a path comprising the following elements: the friction clutch consisting of the forward end of the spring 42 and the adjacent surface of the cover 16, the windings of the spring 42, the friction clutch consisting of the rear end of the spring 42 and the corresponding surface of the lift ring 39, the lift ring 39, the spider sleeve 27, the friction clutch established by the adjacent surfaces of the spider sleeve 27 and the flange 28, the coupling sleeve 29, the traction sleeve 30, the ball 32, the sliding sleeve 33, and the coupling b—b. It should be noted that such manual adjustment could only be carried out against the resistance offered by the clutch c—c (transmitting a force corresponding to the difference between the forces of the springs 35 and 42) and the clutch a—a (transmitting the force of the springs 35+42).

The tubular rod 18 is guided in the housing 15 by the front cover 16 and the unit of the coupling sleeve 29 and traction sleeve 30. The rod 19 is guided in the bore of the tubular rod 18 by the sleeve 22 and the nut 61. It is guided relative to the rear cover 17 by the part 60 of the feeding nut 24.

It will be realized that during use unintentional rotation of the feeding and locking nuts as a result of heavy vibrations is practically excluded because the feeding nut is locked to the housing by the toothed engagement e—e while the housing is locked to the front rod part through the wedge-like coupling b—b at relatively great diameter under the force of the spring 42 and through the frictional engagement of the spider sleeve and the coupling sleeve at coupling a—a under a spring force equal to the sum of the springs 35 and 42.

Moreover, it will be seen that the inevitable axial extension of the brake adjuster during the braking stroke has been reduced to a minimum. Such extension occurs when the coupling b—b is released and the coupling d—d is engaged. Another increase of length occurs when the sliding sleeve moves to abut the coupling sleeve. Now, the latter increase has been practically eliminated in the embodiment illustrated where the lift ring always contacts the ball bearing 38 and is always angularly locked to the spider sleeve. Thus, a release of the coupling a—a is possible practically without any axial displacement of the flange 28. Therefore the axial distance between the coupling sleeve and the sliding sleeve can be made smaller in the new device than is previously known slack adjusters of the same general type.

It will be understood that the principal object of the spring 35 is to define a critical value of the braking force higher than the force of the spring 42 for the opening of the clutch a—a, so that the force of the spring 42— which is still to be compressed through a considerable distance after the clutch a—a has been opened—may be limited to the value necessary for overcoming the resistance of the brake rigging until the brake shoes engage the wheels, whereby the loss of energy in the slack adjuster is reduced since the strong spring 35 has only a very small compression stroke. Where this consideration is not important—e.g. where the full braking pressure is of the same order of size as the resistance of the brake rigging, such as may particularly be the case if the coefficient of friction between the brake shoes and the wheel is extremely high—it is unimportant whether the spring 35 is stronger than the spring 42, and in fact the spring 35 may then be entirely dispensed with, and the traction sleeve 30, the coupling sleeve 29 and the sliding sleeve 33 may be combined to form an integral unit directly engaging the spider sleeve 27. In that case the clutch c—c will be disengaged in the released state of the brake adjuster, and the spring force determining the opening of clutch a—a will be that of the spring 42.

The modification of the left hand end of the slack adjuster illustrated in FIG. 4 differs from that of FIGS. 2–3 mainly in that the function of detaining the feeding nut 24 relative to the housing 15 upon a certain relative travel of both, and the function of supporting and controlling the spring 53 have been separated.

In FIG. 4, parts corresponding to parts of the embodiment of FIGS. 2 and 3 have been marked by the same reference characters.

The roller bearing 49 has been replaced by two roller bearings 49a and 49b, the former being directly engageable with the locking ring 59 upon a relative displacement of the feeding nut 24 and the housing 15 slightly exceeding the axial overlap of the teeth of clutch e—e, the latter supporting the left hand end of the spring 53 and being itself supported against an annular abutment 101 of the feeding nut 24.

A sleeve 50a is forwardly engageable with an annular abutment 102 of the feeding nut 24 and at its front end is constructed with an outwardly bent flange 103 supporting the right hand end of the spring 53 and engageable with a ring member 104 attached to the rear end of the locking nut 23.

It will be realized that when the roller bearing 49a strikes the locking ring 59 and is detained thereby, the sleeve 50a and thereby the right hand end of the spring 53 are detained by the abutment 102 of the feeding nut 24 while the locking nut 23 continues to travel so as to separate the locking 23 from the sleeve 50a. Moreover, it will be realized that when the locking nut 23 and the feeding nut 24 are approached to each other from their normal relative positions, the spring 53 will be compressed between these two nuts.

Thus, the function of the slack adjuster in the braking stroke and the release stroke at normal slack, excessive slack and too small slack will be exactly the same as above described with reference to the embodiment illustrated in FIGS. 2 and 3.

We claim:

1. In a double-acting automatic slack adjuster connecting two brake rod parts and of the type in which adjustment by rotating two nuts inside a barrel of said slack adjuster may be carried out manually by rotating said barrel, the provision of means for transmitting torque from said barrel to one of said nuts, comprising a barrel spring, a lift ring, a traction sleeve transmitting the braking force to said one nut when the braking force exceeds the force of said barrel spring, a spider sleeve clamped between a shoulder on one of said rod parts and said traction sleeve under the influence of a strong spring, said spider sleeve and said lift ring being clutchably connected in such a manner as to permit relative axial movement thereof.

2. An automatic slack adjuster for brakes comprising an elongated housing, a front rod part extending into said housing through the front end thereof, a rear rod part extending into said housing through the rear end thereof, said rear rod part being constructed with a nonself-locking screw thread, both of said rod parts being slidably mounted with respect to said housing, a feeding nut and a locking nut carried by said screw thread of said rear rod part, spring influenced sliding means in said housing for rearwardly clutchably engaging said locking nut up to a certain value of the braking force transmitted through the slack adjuster and forwardly clutchably engaging said locking nut at braking forces above said certain value, and for locking said housing against rotation relative to said front rod part at braking forces below a certain value at least as high as said first mentioned value, said spring influenced sliding means having a limited axial play relative to said front rod part, tooth means clutchably connecting said feeding nut and said housing in the neutral position of the slack adjuster, a telescopically compressible sleeve mounted between said feeding nut and said locking nut, a biased spring in said telescopically compressible sleeve, the latter having an axial play relative to a shoulder of said housing slightly greater than the overlapping of said tooth means, and means for detaining said housing upon a certain travel thereof from its neutral position.

3. An automatic slack adjuster for brakes comprising an elongated housing, a front rod part extending into said housing through the front end thereof, a rear rod part extending into said housing through the rear end thereof, said rear rod part being constructed with a non self-locking screw thread, both of said rod parts being slidably mounted with respect to said housing, a feeding nut and a locking nut carried by said screw thread of said rear rod part, spring influenced sliding means in said housing for rearwardly clutchably engaging said locking nut up to a certain value of the braking force transmitted through the slack adjuster and forwardly clutchably engaging said locking nut at braking forces above said certain value, and for urging an element of said sliding means towards an abutment of said front rod part at braking forces below a certain value at least as high as said first mentioned value, said spring influenced sliding means having a limited axial play with respect to said front rod part, a spider sleeve interposed between said element of said sliding means and said abutment, a spring supporting ring engaged by said spider sleeve in such a manner as to be non-rotatable but axially slidable relative thereto, said spring supporting ring being rearwardly rotationally engageable with said front rod part, a biased spring between said spring supporting ring and the front end of said housing, means for detaining said housing upon a certain travel thereof from its neutral position, means clutchably connecting said housing and said feeding nut in the neutral position of the slack adjuster and disengageable upon relative axial displacement of both, spring means between said feeding nut and said locking nut, and means for limiting axial expansion of said last mentioned spring means.

4. An automatic slack adjuster for brakes comprising an elongated housing, a front rod part extending into said housing through the front end thereof, a rear rod part extending into said housing through the rear end thereof, said rear rod part being constructed with a non self-locking screw thread, both of said rod parts being slidably mounted with respect to said housing, a feeding nut and a locking nut carried by said screw thread of said rear rod part, spring influenced sliding means in said housing for rearwardly clutchably engaging said locking nut up to a certain value of the braking force transmitted through the slack adjuster and forwardly clutchably engaging said locking nut at braking forces above said certain value, and for urging an element of said sliding means towards an abutment of said front rod part at braking forces below a certain value at least as high as said first mentioned value, said sliding means having a limited axial play with respect to said front rod part, a spider sleeve interposed between said element of said sliding means and said abutment, a spring supporting ring engaged by said spider sleeve in such a manner as to be non-rotatable but axially slidable relative thereto, said spring supporting ring being rearwardly rotationally engageable with said front rod part, a biased spring between said spring supporting means and the front end of said housing, tooth means clutchably connecting said feeding nut and said housing in the neutral position of the slack adjuster, means for detaining said feeding nut relative to said housing upon a relative travel of both sufficient to disengage said tooth means, spring means between said feeding nut and said locking nut, means for detaining the front end of said last mentioned spring means with respect to said feeding nut, and means for detaining said housing upon a certain travel thereof from its neutral position.

5. An automatic slack adjuster for brakes comprising an elongated housing, a front rod part extending into said housing through the front end thereof, a rear rod part extending into said housing through the rear end therof, said rear rod part being constructed with a nonself-locking screw thread, both of said rod parts being slidably mounted with respect to said housing, a feeding nut and a locking nut carried by said screw thread of said rear rod part, a traction sleeve assembly rotatably and slidably mounted in said housing, said traction sleeve assembly having a limited axial play relating to said front rod part and being alternatively forwardly and rearwardly clutchably engageable with said locking nut depending on the braking force transmitted through the slack adjuster, a spring forwardly engageable with said front rod part and rearwardly rotationally engageable with said locking nut, a spring supporting ring rotatably and slidably mounted on said front rod part, said ring being rearwardly clutchably engageable with said traction sleeve assembly, a spring mounted between said spring supporting ring and the front end of said housing, tooth means on said feeding nut rearwardly clutchably engageable with tooth means on said housing, means for detaining said feeding nut relative to said housing upon a relative travel of both sufficient to disengage said tooth means, spring means between said feeding nut and said locking nut, means for detaining the front end of said last mentioned spring means with respect to said feeding nut, and means for detaining said housing upon a certain travel thereof from its neutral position.

6. An automatic slack adjuster for brakes comprising an elongated housing, a front rod part extending into said housing through the front end thereof, a rear rod part extending into said housing through the rear end thereof, said rear rod part being constructed with a nonself-locking screw thread, both of said rod parts being slidably mounted with respect to said housing, a feeding nut and a locking nut carried by said screw thread of said rear rod part, a traction sleeve assembly rotatably and slidably mounted in said housing, said traction sleeve assembly having a limited axial play with respect to said front rod part and being alternatively forwardly and rearwardly clutchably engageable with said locking nut depending on the braking force transmitted through the slack adjuster, a spring forwardly engageable with said front rod part and rearwardly rotationally engageable with said locking nut, a spring supporting ring rotatably and slidably mounted on said front rod part, said ring being rearwardly clutchably engageable with said traction sleeve assembly, a spring mounted between said spring supporting ring and the front end of said housing, tooth means on said feeding nut rearwardly clutchably engageable with tooth means on said housing, a telescopically compressible sleeve mounted between said feeding nut and said locking nut, a biased spring in said telescopically compressible sleeve, the latter having an axial play relative to a shoulder of said housing slightly greater than the overlapping of said tooth means, and means for detaining said housing upon a certain travel thereof from its neutral position.

7. An automatic slack adjuster for brakes comprising an elongated housing, a front rod part extending into said housing through the front end thereof, a rear rod part extending into said housing through the rear end thereof, said rear rod part being constructed with a nonself-locking thread, both of said rod parts being slidably mounted with respect to said housing, a feeding nut and a locking nut carried by said screw thread of said rear rod part, a traction sleeve assembly rotatably and slidably mounted in said housing, said traction sleeve assembly having a limited axial play with respect to said front rod part and being alternatively forwardly and rearwardly clutchably engageable with said locking nut depending on the braking force transmitted through the slack adjuster and being forwardly clutchably engageable with an abutment of said front rod part, a spider sleeve being interposed between said traction sleeve assembly and said abutment, a spring forwardly engageable with said front rod part and rearwardly rotationally engageable with said locking nut, a spring supporting ring rotatably and slidably mounted on said front rod part, said ring being rearwardly rotationally engageable with said front rod part, means on said spring supporting ring and said spider sleeve slidably but non-rotatably connecting same, a spring mounted between said spring supporting ring and the front end of said housing, means for detaining said housing upon a certain travel thereof from its neutral position, means clutchably connecting said housing and said feeding nut in the neutral position of the slack adjuster and disengageable upon relative axial displacement of both, spring means between said feeding nut and said locking nut, and means for limiting axial expansion of said last mentioned spring means.

8. An automatic slack adjuster for brakes comprising an elongated housing, a front rod part extending into said housing through the front end thereof, a rear rod part extending into said housing through the rear end thereof, said rear rod part being constructed with a non-self-locking screw thread, both of said rod parts being slidably mounted with respect to said housing, a feeding nut and a locking nut carried by said screw thread of said rear rod part, a traction sleeve assembly rotatably and slidably mounted in said housing, said traction sleeve assembly having a limited axial play with respect to said front rod part and being alternatively forwardly and rearwardly clutchably engageable with said locking nut depending on the braking force transmitted through the slack adjuster, a spring forwardly engageable with said front rod part and rearwardly rotationally engageable with said locking nut, a spring supporting ring rotatably and slidably mounted on said front rod part, said ring being rearwardly clutchably engageable with said traction sleeve assembly, a spring mounted between said spring supporting ring and the front end of said housing, tooth means on said feeding nut rearwardly clutchably engageable with tooth means on said housing, a telescopically compressible sleeve mounted between said feeding nut and said locking nut, said sleeve being composed of a first sleeve part rearwardly rotationally engageable with said feeding nut, a second sleeve part forwardly engageable with said first sleeve part and forwardly engageable with an abutment of said housing at a play from the neutral position of the slack adjuster greater than the overlapping of said tooth means, a third sleeve part forwardly engageable with said second sleeve part and with said locking nut, and a biased spring between and first and third sleeve parts, the slack adjuster further comprising means for detaining said housing upon a certain travel thereof from its neutral position.

9. An automatic slack adjuster for brakes comprising an elongated housing, a front rod part extending into said housing through the front end thereof, a rear rod part extending into said housing from the rear end thereof, said rear rod part being constructed with a nonself-locking screw thread, both of said rod parts being slidably mounted with respect to said housing, a feeding nut and a locking nut carried by said screw thread of said rear rod part, a traction sleeve assembly rotatably and slidably mounted in said housing, said traction sleeve assembly having a limited axial play with respect to said front rod part and being alternatively forwardly and rearwardly clutchably engageable with said locking nut depending on the braking force transmitted through the slack adjuster, and being forwardly engageable with an abutment on said front rod part, a spider sleeve being interposed between said traction sleeve assembly and said abutment, a spring forwardly engageable with said front rod part and rearwardly rotationally engageable with said locking nut, spring supporting ring rotatably and slidably mounted on said front rod part, said ring being rearwardly rotationally engageable with said front rod part, means on said spring supporting ring and said spider sleeve slidably but non-rotatably connecting same, a spring mounted between said spring supporting ring and the front end of said housing, tooth means on said feeding nut rearwardly clutchably engageable with tooth means on said housing, a telescopically compressible sleeve mounted between said feeding nut and said locking nut, said sleeve being composed of a first sleeve part rearwardly rotationally engageable with said feeding nut, a second sleeve part forwardly engageable with said first sleeve part and forwardly engageable with an abutment of said housing at a play from the neutral position of the slack adjuster greater than the overlapping of said tooth means, a third sleeve part forwardly engageable with said second sleeve part and with said locking nut, and a biased spring between said first and third sleeve parts, the slack adjuster further comprising means for detaining said housing upon a certain travel thereof from its neutral position.

References Cited by the Examiner
UNITED STATES PATENTS

| | | | |
|---|---|---|---|
| 2,767,811 | 10/1956 | Browall et al. | 188—196 |
| 2,837,179 | 6/1958 | Jeppsson | 188—196 |
| 3,194,358 | 7/1965 | Brandt | 188—196 |

DUANE A. REGER, *Primary Examiner.*